United States Patent [19]

Proulx

[11] Patent Number: 4,458,419
[45] Date of Patent: Jul. 10, 1984

[54] SIMPLIFIED FLAIL FEEDOUT MECHANISM FOR A ROTARY MOWER

[76] Inventor: Raymond E. Proulx, 5837 Cameo, Alta Loma, Calif. 91701

[21] Appl. No.: 420,287

[22] Filed: Sep. 20, 1982

[51] Int. Cl.³ .............................................. A01D 50/00
[52] U.S. Cl. .................................... 30/276; 30/347
[58] Field of Search ................................ 30/276, 347

[56] References Cited

U.S. PATENT DOCUMENTS

| | | | |
|---|---|---|---|
| 4,203,212 | 5/1980 | Proulx | 30/276 |
| 4,259,782 | 4/1981 | Proulx | 30/276 |
| 4,274,201 | 6/1981 | Oberg | 30/276 |

Primary Examiner—Jimmy C. Peters
Attorney, Agent, or Firm—Boniard I. Brown

[57] ABSTRACT

A convenience improvement for rotary mowers, trimmers and edgers of vegetation that have a rotating body from which one or more flexible cord-like filamentous cutting blades or flails extend radially so that additional flail length can be fed from the device by merely bumping the rotating body on the ground. A pair of disc-shaped cams, preferably having square peripheries, are radially mounted on the centerline of the cutter, oriented at 45° to each other. They interact with a cam follower so that when a first cam is moved axially out of contact with the follower, by bumping of the rotating body on the ground, the other moves axially into engagement with the follower after a 45° rotation. Once the bump is over, the second cam moves axially in the reverse direction, disengaging the cam follower and allowing another 45° of rotation before the first cam, repositioned by the axial movement comes into abutment contact with the cam follower. The 90° rotation allows a predetermined length of flail to be fed out through the body of the device.

11 Claims, 6 Drawing Figures

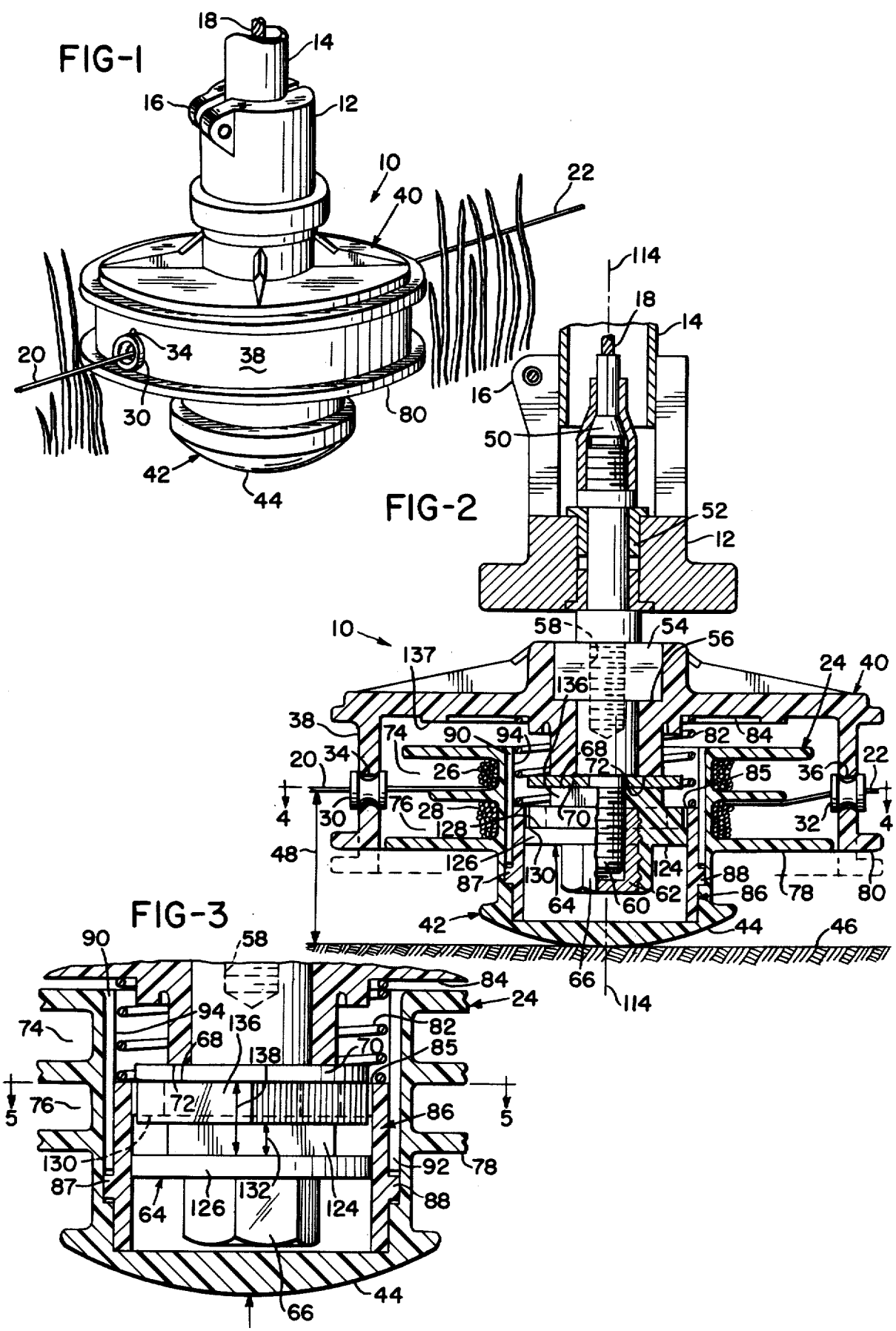

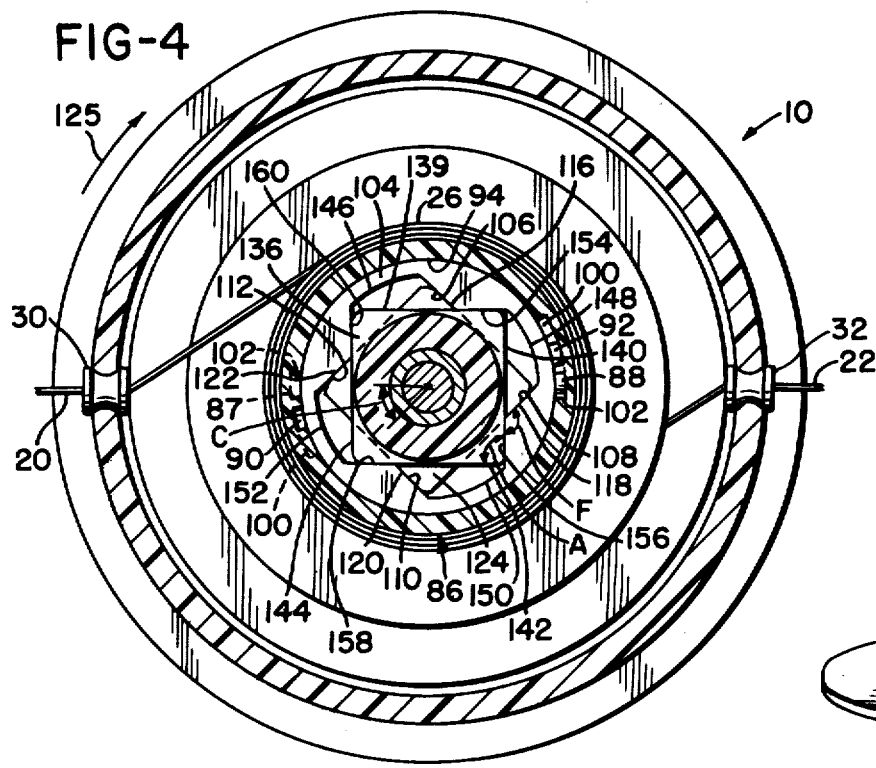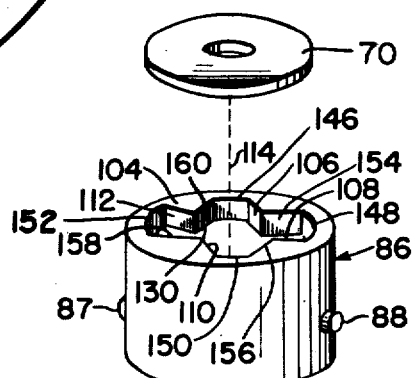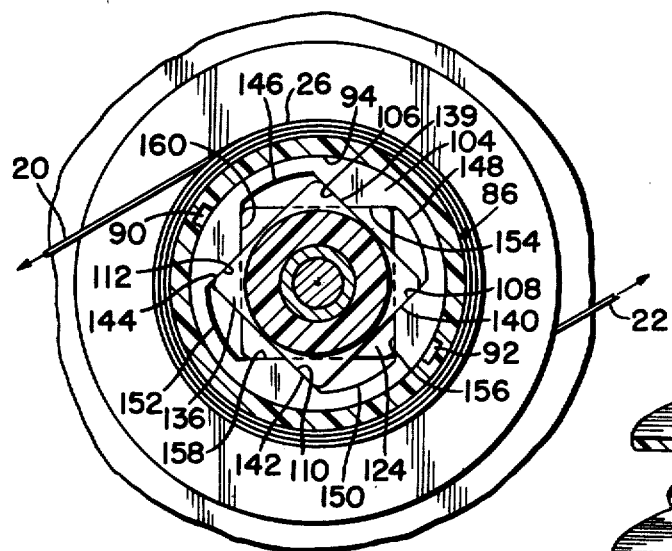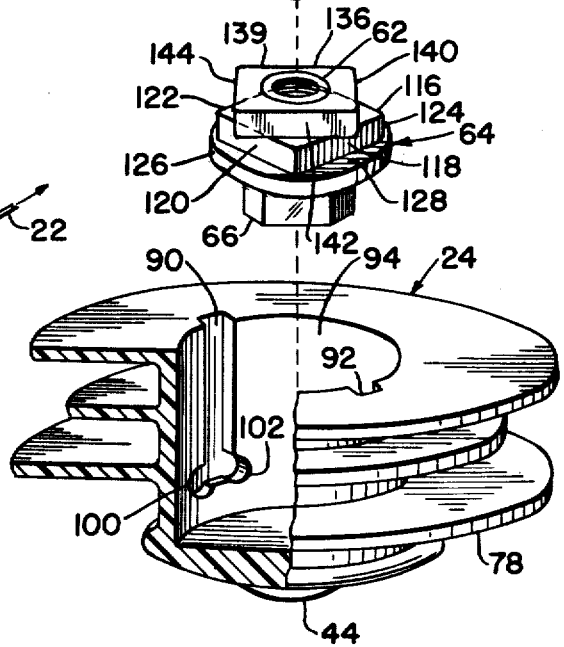

SIMPLIFIED FLAIL FEEDOUT MECHANISM FOR A ROTARY MOWER

CROSS REFERENCE TO RELATED PATENT

The present invention is related to U.S. Pat. No. 4,259,782, entitled "Flail Feedout Mechanism for Rotary Mower," by Raymond E. Proulx, which is hereby incorporated by reference as though fully set forth hereinbelow.

BACKGROUND OF THE INVENTION

This invention relates to improved flail feedout means for mowing and trimming devices used to trim grass, weeds, and other vegetation, of the rotary type equipped with flexible cord-like flails formed of generally cylindrical fibers. Grass and weed cutters of this general type are now widely used. Examples are described in REBER, U.S. Pat. No. 3,664,102; BALLAS et al, U.S. Pat. No. 3,826,068; MIZUNO et al, U.S. Pat. No. 4,020,552; BALLAS et al, U.S. Pat. No. 4,035,912; PROULX, U.S. Pat. No. 4,097,991; PERDUE, U.S. Pat. No. 4,134,204; TORO, Belgium Pat. No. 852,150; PROULX, U.S. Pat. No. 4,203,212; and PROULX, U.S. Pat. No. 4,259,782. Such devices are available on the market with automatic flail feedout mechanisms which respond to a bump on the ground intentionally applied by the operator or by application of force applied thereto by some mechanical arrangement. Such mechanisms usually consist of a dog or friction clutch located between a spool of flail and the case thereabout through which the flail is fed. By bumping an extension of the spool on the ground, the friction clutch is disengaged for a length of time dependent on the duration of the bump. The dog clutch released by the bump then abruptly engages at the next opportunity to feed out flail in segment lengths which are related to the engagement points of the dog clutch. Such dog clutches have outwardly extending ribs which engage inwardly extending abutment tangs and therefore depend upon a skillful bump when it is desired that they deliver only one segment length. However, friction within the device and over zealous bumping can result in two or more line segments being fed out, especially when the device has been in use and the corners on the ribs and tangs have worn so that positive engagement is no longer assured. The unavoidable abrupt operation of the dog clutch causes the wear to take place. Therefore, there has been need for a feedout mechanism which automatically feeds out a predetermined length of flail per bump, which does not lose this capability with extended use, and which is easy to construct and maintain.

Other mowers such as are shown in Applicant's U.S. Pat. Nos. 4,203,212 and 4,259,782 include flail feedout means. These means have a downwardly projecting bumper as part of the flail spool which normally is used to space the flail above the surface in the plane in which the vegetation is cut. This spool, bumper and an intermediate cylinder, as an assembly, are spring loaded downwardly with respect to the spinning housing. Extending inwardly from the intermediate cylinder are tangs which ride in a serpentinous cam slot in a cam member fixed to the housing. When the bumper is bumped on the ground, the intermediate cylinder is moved upwardly so that its tangs ride up relatively vertical cam surfaces until they reach spiral surfaces which extend downwardly to the next vertical cam surface. The net effect is that the spool connected to the intermediate members and the housing connected to the cam member rotate relative to each other to allow a predetermined length of flail to feed out by centrifugal force. This system works well, but the serpentinous cam is not as economical to manufacture as is desired and the tangs, no matter how they are multiplied, can only present a limited contact area for engagement to the serpentinous cam. Therefore, there has been a need for a flail feedout mechanism which operates as effectively and reliably as those shown in U.S. Pat. No. 4,259,782, which can be manufactured at a lower cost, and which is more reliable in service.

SUMMARY OF THE INVENTION

The present simplified rotary mowing and trimming device employs a flail feedout constructed on the same basic plan as those shown in Applicant's U.S. Pat. No. 4,259,782. The mower includes a handle with drive means which are connected to a spinning housing which contains a spool of one or more coils of filaments used for flails, one or more orifices so that the flails can be fed out through the housing into cutting positions, and simplified means which normally restrict movement between the spool and the housing. The simplified means allow, upon bumping of a bumper member on the ground, a predetermined relative rotation between the spool and the housing so that additional flail length can be fed out of the orifices. These last mentioned means include as part of the spool, a downwardly projecting bumper which normally is used to space the flail above the surface on which the vegetation is being cut. The spool, bumper and intermediate cam follower member as an assembly are spring loaded axially away from the spinning housing. The cam follower member includes a plurality of generally inwardly facing abutment surfaces arrayed about the axis of rotation of the housing. Under normal circumstances, a cam drive member which is driven rotationally by the drive means engages the cam follower abutment surfaces with a lower cam to connect the housing and spool together for rotation. When the bumper is bumped on the ground, the housing moves downwardly with respect to the spool, disengaging the lower cam from the cam follower after a similar upper cam oriented rotationaly at 45° thereto, has moved in position to engage the same abutment surfaces, which it does after a 45° relative rotation of the spool and housing. Once the force of the bump has been dissipated, the spring loading forces the spool and housing back to their original relative positions, which releases the upper cam from the abutment surfaces after the lower cam is in position to re-engage the cam follower and allows another 45° of relative rotation for a total of 90°. This provides the predetermined relative rotation between the housing and the spool needed to feed flail out through the orifices. The cams themselves preferably are of identical square configuration, although other regular shapes can be used. Since they can interact with simple, inwardly facing cam follower surfaces formed only on one level, the release mechanism is relatively economical to manufacture. Also, since large abutment surface areas are presented between the cams and the cam follower, the device is extremely robust, trouble-free and reliable.

It is therefore and object of the present invention to provide simplified means for automatically feeding flail out of a rotary mower while maintaining the advantageous operational features of prior mowers.

Another object is to provide automatic flail feedout means which are reliable, easy and economical to manufacture, and reliable in the harsh environments in which mowers are used.

Another object is to provide a mower which feeds out a predetermined amount of flail when desired.

Another object is to provide an automatic flail feedout mechanism whose engagement surfaces have a relatively large contact area to reduce the pressure applied thereto.

These and other objects and advantages of the present invention will become apparent to those skilled in the art after considering the following detailed specification which covers a preferred embodiment, in conjunction with the accompanying drawings, wherein:

BRIEF DESCRIPTION OF THE DRAWINGS

FIG. 1 is a perspective view of a complete mower cutting head constructed according to the present invention, in cutting position on the ground;

FIG. 2 is a cross-sectional side view of the cutting head of FIG. 1, showing its normal relationship with respect to the ground;

FIG. 3 is an enlarged detailed cross-sectional view of the automatic flail feedout mechanism employed in the mower of FIGS. 1 and 2 in its flail feeding position;

FIG. 4 is a cross-sectional view taken on line 4—4 of FIG. 2 with the automatic flail feedout mechanism in its normal non-feeding position;

FIG. 5 is a view similar to FIG. 4 with the automatic flail feedout mechanism in its flail feeding position; and FIG. 6 is an exploded view of the automatic flail feedout mechanism.

DETAILED DESCRIPTION OF THE PREFERRED EMBODIMENT

Referring to the drawings more particularly by reference number, 10 in FIG. 1 refers to a cutting head of a flail-type vegetation cutter. The cutting head 10 is mounted for rotation on a bearing block 12 which is fastened to a hollow handle 14 by means such as the friction clamp portion 16 of the bearing block 12. The cutting head 10 is rotated by a flexible shaft 18 which passes through the handle 14 and is rotatably driven by suitable motor means (not shown). One or more filamentous flexible flails 20 and 22 are impelled into a radially extending attitude by the centrifugal force generated by the rotation of the head 10. The flails 20 and 22 cut the grass or other vegetation by whip-like impact. It is preferable that the flails 20 and 22 be of nylon monofilament which is stored on a split spool 24 in separate coils 26 and 28, respectively, as shown in FIG. 2. The flails 20 and 22 extend outwardly from the coils 26 and 28 through grommets 30 and 32 which are held in slots 34 and 36, respectively, in the cylindrical skirt portion 38 of the cutting head 10.

The cutting head 10 is made in two main components, a cap 40 and a spool assembly 42. The spool assembly 42 includes a downwardly projecting bumper 44 which is designed for relatively frictionless spinning contact with the ground 46. The main function of the bumper 44 is to allow the operator to accurately gauge the height 48 of the flails 20 and 22 above the ground 46.

As can be seen in FIG. 2, suitable shaft means 50 are connected to the flexible shaft 18 and extend through a bearing 52 in the bearing block 12 down into the cap 10 to spin the cap 40 relative to the block 12. The cap 40 includes a stud support member 54 which extends into a stepped orifice 56 in the cap 40 and includes an upwardly facing threaded bore 58 for engagement with the shaft 50, and a downwardly extending screw 60. The screw 60 is threadably engaged by a metal insert 62 usually molded into a cam member 64. The cam member 64 usually includes a hexagonal lower portion 66 which allows the cam member 64 to be tightly threaded onto the screw 60 so its upper surface 68 urges a washer 70 against a lower radial surface 72 of the cap 40 and the member 54, thus, to assure that the cam member 64 turns with the cap 40 as it is being driven so that screw 60 and the cam member do not disengage. By engaging cam member 64, it restrains spool 24 of the spool assembly 42 from engaging fender ring 137 of cap 40.

The spool assembly 42 includes the spool 24 which has concentric chambers 74 and 76 to retain the coils 26 and 28 in position to be fed out through grommets 30 and 32. The lower chamber wall 78 of the lower chamber 76 forms the bottom surface of the spool chambers and is generally in alignment with the under surface 80 of the cap 40 when the mower 10 is in a non-bump configuration.

When it is desired to increase the length of the flails 20 and 22 by feeding additional filament from the coils 26 and 28, the head 10 is lifted an then bumped on the ground 46 so that the bumper 44 abruptly contacts the ground 46. Since the bumper 44 is integral to the spool assembly 42, this forces the cap 40 downwardly with respect to the spool assembly 42 so that the under surface 80 reaches the location shown in phantom outline in FIG. 2. This motion is resisted by an internal concentric spring 82 which acts between an interior radial downwardly facing surface 84 of the cap 40 and the radial upwardly facing surface 85 of an intermediate cam follower member 86.

The cam follower member 86 is locked in radial position to the spool assembly 42 by means of outwardly extending resilient tabs 87 and 88 which slide in vertical slots 90 and 92 in the inner cylindrical surface 94 of the spool assembly 42. The follower member 86 is retained in vertical position by the resilient outwardly extending tabs 87 and 88 which mate with cavities 100 or 102 extending laterally from the slots 90 and 92 in the inner cylindrical surface 94.

As shown in FIG. 4, the cam follower member 86 includes a radial disc portion 104 defining a plurality of inwardly facing flat surfaces 106, 108, 110, and 112, which are parallel to the axis of rotation 114 of the cutting head 10 (indicated in FIG. 2). When the head 10 is in its normal cutting condition, the surfaces 106, 108, 110, and 112 are engaged by the flat surfaces 116, 118, 120, and 122, respectively, of a generally square lower cam 124 formed on the cam member 64. In this position the cam member 64 drives the spool assembly 42 in unison with the cap 40 in the direction of arrow 125. The lower cam 124 is maintained in this position by the spring 82 and a radially oriented disc 126 whose upper surface 128 abuts a lower radial surface 130 of the follower member 86 adjacent the follower surfaces 116, 118, 120, and 122. The thickness 132 of the lower cam 124 is at least as that of the radial disc portion 104 of the follower 86 in which the follower surfaces 116, 118, 120, and 122 are formed. This assures that, when the lower cam 124 is in complete engagement with the follower member 86, a similar cam 136, positioned above and adjacent thereto and rotated 45° therefrom, is totally disengaged from the surfaces 106, 108, 110, and 112.

When it is desired to feed out the flails 20 and 22, the head 10 is bumped on the ground 46 which compresses the spring 82 and allows relative vertical motion between the follower member 86 and the cam member 64. The total amount of relative movement is restricted by a fender ring 137 formed on the surface 84 of the cap 40, to less than the width 138 of both cams 124 and 136 so that one cam must be within the disc portion 104 of the follower member 86. The bump causes the cam member 64 to slide downwardly with respect to the follower member 86 to the position shown in FIG. 3. This results in the 45° relative rotation between the spool assembly 42 and the cap 40, shown in FIG. 5, with the flat surfaces 139, 140, 142, and 144 in contact with the follower surfaces 106, 108, 110, and 112, respectively. Once the bump has been completed and there has been a 45° relative rotation, the cam 136 slides upwardly off of the cam follower 86, positioning the cam 126 for re-engagement. Another 45° of relative rotation occurs and the head 10 moves to the general configuration of FIG. 4 with a 90° relative rotation. It should be noted that prior to release of either cam 124 or 136, the other(136 or 124)must be in position to engage the cam follower 86, thereby making excessive flail release impossible. This is true even in instances where the operator holds the bumper 44 on the ground, instead of bouncing it, to obtain a flail feedout. When this occurs, only a 45° relative rotation of the spool assembly 42 and the cap 40 is accomplished since the upper cam 136 does not disengage the follower assembly 86 until the pressure compressing the spring 82 is relieved.

It should be noted that the follower includes relief surfaces 146, 148, 150, and 152 behind the surfaces 106, 108, 110, and 112 so that the cams 124 and 136 can slide vertically with respect to the cam follower 86 when the cams 124 and 136 are in the positions shown in FIGS. 4 and 5, but at no other times. In FIG. 5, the cams 124 and 136 are free to slide upwardly to disengage the cam 136 and in FIG. 4, free to slide downwardly to disengage the cam 124. This results in a 90° relative rotation between the cap 40 and the spool assembly 42 per bump, but not more than 90°, which 90° is gained in two 45° segments. The relative rotational speed possible to build up by the flails 20 and 22 pulling on the spool is insufficient to inflict impact damage on the cams 124 and 136 or the cam follower 86 during each of these 45° movements. The direction as shown by the arrow 125 is chosen only for clarity of the operation of the head 10. The head can be spun in the opposite direction as well, and the cams 124 and 136 will still provide the 90° relative rotation by interacting with the surfaces 154, 156, 158 and 160. It should be noted that the surfaces 154, 156, 158 and 160 form 135° angles with surfaces 106, 108, 110, and 112. Cams having three or more flat sides are possible, with the four sided cams 124 and 136 being a practical compromise between surface contact area, ease of manufacture, and the desired flail feedout. All the cams, no matter how many surfaces they have, are symetrical, having an interior angle A between their cam surfaces which engage the follower member. The angle A equals 180°-(360°/S) where S is the number of surfaces on each cam. The cams are rotationally oriented at an angle C to each other which equals 180°/S, and the 2S cam follower surfaces that are required have an interior angle F which equals 180°-(180°/S).

Thus there has been shown and described a novel automatic flail feedout mechanism which fulfills all the objects and advantages sought therefor. Many changes, modifications, variations, and other uses and applications of the subject invention will, however, become apparent to those skilled in the art after considering the foregoing specification together with the accompanying drawings and claims. All such changes, modifications, variations, and other uses and applications which do not depart from the spirit and scope of the invention are deemed to be covered by the invention which is limited only by the claims which follow.

What is claimed is:

1. A spinning mower head comprising:
   a cap assembly having at least one cutting flail extending outwardly therefrom;
   a spool assembly having a common axis of rotation with said cap assembly and a bumper for engagement with the ground; and
   flail feed means to provide outward feeding of predetermined lengths of flail in response to the striking of said bumper on the ground, said flail feed means including:
   a cam member connected with one of said assemblies having first and second adjacent, similarly shaped first and second cams rotationally oriented at 45° to each other and extending radially outwardly from said axis of rotation, said first and second cams each having four outer cam surfaces meeting at about 90°; and
   a follower member connected with the other of said assemblies and having a disc portion with a plurality of pairs of inwardly facing follower surfaces parallel to said axis of rotation, said pairs of said inwardly facing follower surfaces meeting at about 135° and being adapted to selectively engage said cam surfaces in predetermined increments in response to the striking of said bumper on the ground, whereby relative rotation in produced between said cap and spool assemblies.

2. The spinning mower head defined in claim 1, wherein said follower member is connected to said spool assembly and said cam member is connected to said cap assembly.

3. The spinning mower head defined in claim 1 wherein said inwardly facing follower surfaces are parallel to said axis of rotation.

4. The spinning mower head defined in claim 1 wherein said cam member further includes a stop disc adjacent said second cam and said follower member disc includes a radial abutment surface adjacent said inwardly facing follower surfaces, said stop disc and said radial abutment surface being positioned to engage when said flail feed means are not feeding out flail.

5. A spinning mower head comprising:
   a cap assembly having at least one cutting flail extending outwardly therefrom;
   a spool assembly having a common axis of rotation with said cap assembly and a bumper for engagement with the ground; and
   flail feed means to provide outward feeding of predetermined lengths of flail in response to the striking of said bumper on the ground, said flail feed means including:
   a cam member connected with one of said assemblies and having first and second adjacent, similarly shaped first and second cams extending radially outwardly from said axis of rotation, said first and second cams each including:
   S generally flat outer cam surfaces which intersect adjacent cam surfaces at an angle which equals 180°−(360°/S), said first and second cams being rotationally oriented at 180°/S to each other; and a follower member connected with the other of said assemblies and having a disc portion with inwardly facing follower surfaces adapted to selectively engage said cam surfaces in predetermined increments in response to the striking of said bumper on the ground, whereby relative rotation in produced between said cap and spool assemblies.

6. The spinning mower head defined in claim 5 wherein said follower member includes S pairs of said inwardly facing follower surfaces which intersect each other at angles which equal 180°−(180°/S), one surface of each of said inwardly facing follower surface pairs normally engaging said S generally flat outer cam surfaces of said first cam for a predetermined spin direction of said head and the surfaces of said inwardly facing follower surface pairs normally engaging said S generally flat outer cam surfaces of said first cam when said head is spun in the opposite direction.

7. The spinning mower head defined in claim 5 wherein S equals four.

8. The spinning mower head defined in claim 5 wherein said cam member further includes a stop disc adjacent said second cam and said follower member disc includes a radial abutment surface adjacent said inwardly facing follower surfaces, said stop disc and said radial abutment surface being positioned to engage when said flail feed means are not feeding out flail.

9. The spinning mower head defined in claim 5, wherein said first and second cams are rotationally oriented at 45° to each other.

10. The spinning mower head defined in claim 5, wherein said follower member is connected to said spool assembly and said cam member is connected to said cap assembly.

11. The spinning mower head defined in claim 5, wherein said outer cam surfaces are parallel to said axis of rotation.

* * * * *